United States Patent [19]
Partridge

[11] Patent Number: 5,539,631
[45] Date of Patent: Jul. 23, 1996

[54] CONVERTER CIRCUITS USING A SILICON CONTROLLED RECTIFIER

[75] Inventor: Leslie W. Partridge, Davis, Calif.

[73] Assignee: Ion Systems Incorporated, Berkeley, Calif.

[21] Appl. No.: 260,779

[22] Filed: Jun. 16, 1994

[51] Int. Cl.$^6$ .................................................. H02M 3/315
[52] U.S. Cl. .................... 363/27; 363/28; 363/40; 363/135
[58] Field of Search ................... 363/27, 28, 34, 363/40, 57, 58, 135

[56] References Cited

U.S. PATENT DOCUMENTS

| | | | |
|---|---|---|---|
| 4,777,576 | 10/1988 | Buikema | 363/28 |
| 5,280,455 | 1/1994 | Kanaishi | 365/229 |

Primary Examiner—Peter S. Wong
Assistant Examiner—Shawn Riley
Attorney, Agent, or Firm—Albert C. Smith

[57] ABSTRACT

A voltage converter circuit uses a silicon-controlled rectifier for converting input voltage to selected levels of output voltage. The silicon-controlled rectifier is connected in a circuit including a capacitor which oscillates between charging and discharging to produce a resulting waveform that is applied to a transformer for developing high positive and negative output voltages. Pulses are produced which are asynchronous with alternating line signal. Since the silicon-controlled rectifier operates on DC voltages, an electrolytic capacitor of high capacitance values can be connected between the silicon-controlled rectifier and AC or DC supply lines to substantially reduce noise signals conducted back into the supply line.

4 Claims, 4 Drawing Sheets

5,539,631

CONVERTER CIRCUITS USING A SILICON CONTROLLED RECTIFIER

TECHNICAL FIELD

This invention relates to voltage converters and more particularly to voltage converter circuits using silicon-controlled rectifiers for converting input AC or DC signals to outputs of selected signal levels.

BACKGROUND OF THE INVENTION

High voltage power supplies are known to be useful in the ionization of selected gases such as air or nitrogen. Passing ionized gas over objects susceptible to static discharge prevents the accumulation of charge on the objects, and avoids occurrence of an undesirable discharge event. Accordingly, static voltages can be readily eliminated on objects which are sensitive to static discharge, and in objects which may develop strong mechanical forces as a result of charge accumulation, and in circumstances where static discharge may lead to fire, explosion, damage to the object, or risk of severe injury.

Certain known high voltage power supplies may use large AC transformers. Alternatively, high voltage supplies may user small, high frequency transformers driven by semiconductor circuits operating in packages of reduced size. However, the disadvantage of high voltage supplies using small high frequency transformers is that they generate substantial interference signals which propagate back to the power source and produce detrimental radio interference.

The radio interference thus produced is conventionally reduced by line filters which reduce the radio interference signal to an acceptable level. The line filters include shielded packaging containing capacitor and inductor circuitry which may be physically larger and more expensive than the power supply circuit itself.

Accordingly it is desirable to provide a power supply useful in gas ionization circuits which suppresses interference signals by its fundamental operating mode without the aid of shielding and filtering circuits.

SUMMARY OF THE INVENTION

The present invention is accordingly directed to a high voltage power supply circuit and method of operation that effectively reduces undesirable interference signals. The present invention operates on DC or AC supply voltage and includes a silicon-controlled rectifier (SCR) in a circuit of semiconductor components for driving a small high voltage output transformer.

The high voltage supply circuit of the present invention uses a silicon-controlled rectifier in the driver circuit for a small high frequency output transformer, and further includes circuitry for operation on DC or AC voltage supplies to drive the silicon-controlled rectifier circuit connected to the high-frequency, high-voltage output transformer. Semiconductors and high frequency components permit low cost and compact fabrication which operates without significant interference filtering or shielding on a substantial range of applied voltage levels to produce a substantial range of output power levels. The SCR circuitry is further operable as an asynchronous wave or pulse generator on either AC or DC supply voltages. An inexpensive electrolytic filter capacitor is connected to bypass interference signals before they can pass back to the power source. The circuit of the present invention thus uses a silicon-controlled rectifier to operate in an oscillatory charge and discharge sequence on DC supply voltage.

BRIEF DESCRIPTION OF THE DRAWINGS

FIG. 1b shows a block diagram of the circuit elements of the high-voltage supply circuit of FIG. 1a;

FIG. 1c shows a simplified circuit diagram of the high-voltage supply circuit of FIG. 1a.

DETAILED DESCRIPTION OF THE PREFERRED EMBODIMENTS

Figure 1A:
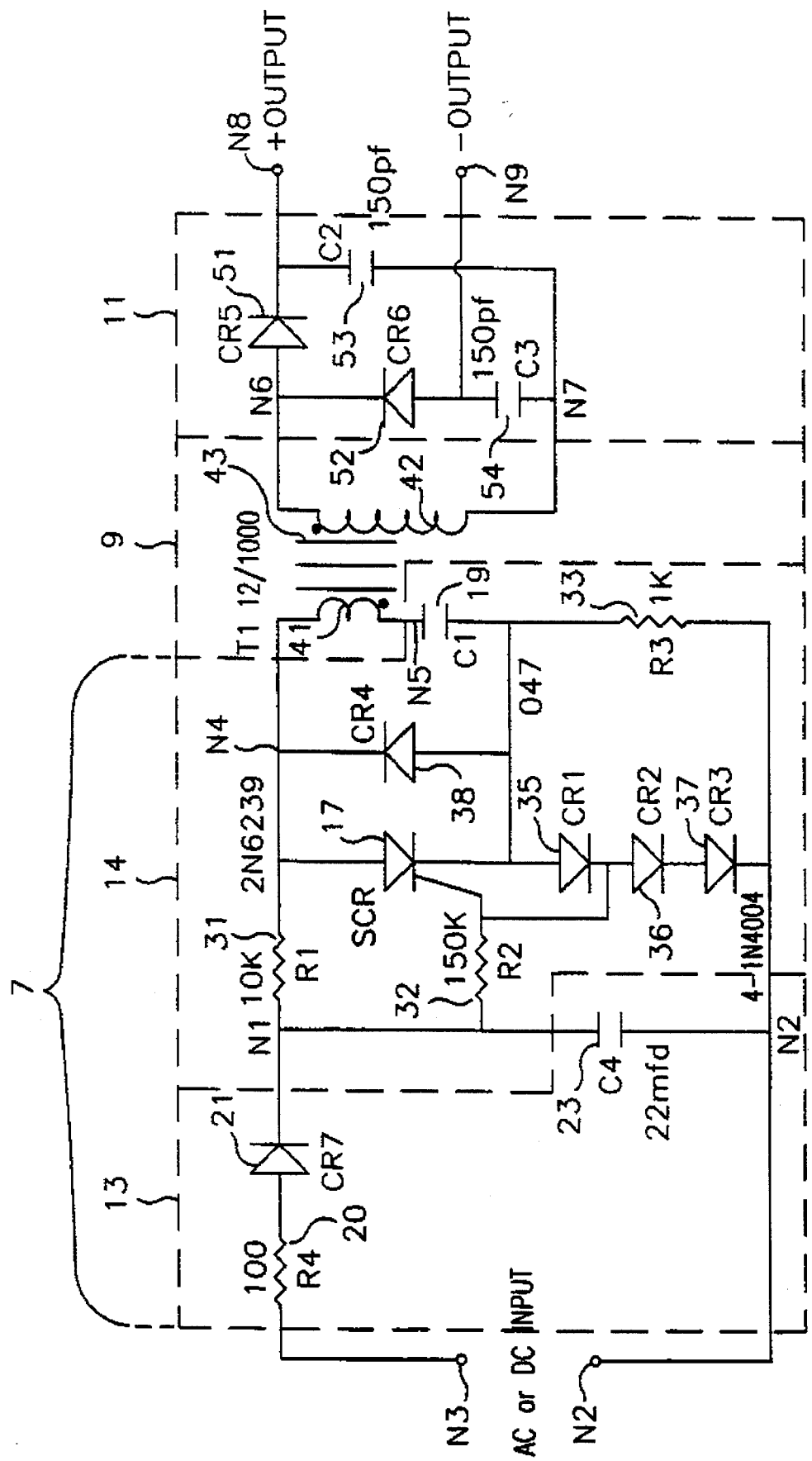
FIG. 1a shows a circuit diagram of the high-voltage supply circuit according to the present invention.

FIG. 1 a shows a circuit diagram of a high-voltage supply circuit 7 according to the present invention. A high-frequency output transformer 9 is connected to the output of the circuit 7 and to a full wave rectifier circuit 11 which rectifies the output of the high frequency output transformer 9. The circuit 7 includes AC to DC conversion circuit 13, and the driver circuit 14 which includes silicon-controlled rectifier 17 and capacitor 19 interconnected as discussed in detail below.

AC to DC conversion circuit 13 in FIG. 1 a includes circuit nodes N1–N3, resistor 20 (also referred to as resistor R4) and diode 21 (also referred to as diode CR7) serially connected between nodes N3 and N1. AC to DC conversion circuit 13 includes filter capacitor 23 (designated capacitor C4) connected between circuit nodes N1 and N2. Thus, for AC line voltage of about 120 volts (RMS) applied between nodes N3 and N2, a rectified voltage level of about 160 volts peak is produced across the terminals of capacitor 23 between nodes N1 and N2. Alternatively, DC or battery voltage may be applied at nodes N3 and N2, or applied directly to nodes N1 and N2. Further, resistor 20, diode 21, and filter capacitor 23 may be omitted where it is desirable to apply DC voltage directly to terminals N1 and N2.

The driver circuit 14 includes resistors 31–33, a capacitor (designated capacitor C1), and the diodes 35–38. The voltage drop across each of diodes 35–38 during forward current conduction is approximately 0.7 volts for silicon diodes. The four diodes 35–38 may be conventional 1N4004 devices, and silicon-controlled rectifier 17 may be a conventional 2N6239 device. Driver circuit 14 is connected at output nodes N4 and N5 to the primary winding 41 of the high frequency output transformer 9. The particular turns ratio of the primary winding 41 to the secondary winding 43 according to one embodiment of the present invention is 12/1000.

Resistor 31 is serially connected with the primary winding 41 of high frequency transformer 9 and the capacitor 19 and the resistor 33 between nodes N1 and N2. Accordingly, DC voltage at nodes N1 and N2 causes a current to flow through resistor R1, windings 41, and capacitor 19, and resistor R3 to charge up capacitor C1.

Silicon-controlled rectifier 17 and diodes CR1–CR3 are connected in series between nodes N4 and N2. Resistor R2 32 is connected in series with diodes CR2 and CR3 between nodes N1 and N2, and the gate of silicon-controlled rectifier 17 is connected to the common connection of resistor 32 with the junction of serially-connected diodes 35 and 36 The diode CR4 is connected in parallel with the silicon-controlled rectifier 17 in opposite conduction relationship with the cathode of one connected to the anode of the other.

In operation, resistor 20 limits the charging current to capacitor C4 within selected limits. A small DC current flows from capacitor C4 through resistor 32 and diodes 36 and 37 to produce a positive voltage of about one volt at the gate of silicon-controlled rectifier 17 as the voltage drop across the diodes 36 and 37 that are connected in series. In addition, a small current initially flows through winding 41 of high frequency transformer 9 to capacitor 19 to charge capacitor 19 to a voltage approaching the DC voltage across capacitor C4. This charging current initially flows primarily through diodes CR1–CR3 and additionally through resistor 33, and the small forward-conduction voltage drop caused by the initial current through diode 35 establishes a negative voltage between the gate and cathode of the silicon-controlled rectifier 17, thus ensuring that it is initially turned off.

The level of the voltage between the gate and cathode of silicon-controlled rectifier 17 is limited to the forward conduction voltage drop across diode 35, and this obviates any avalanche current in the junction of silicon-controlled rectifier 17. As capacitor 19 charges up, the current level decreases and shifts from flowing through diodes CR1–CR3 to primarily flowing through resistor R3. When the voltage drop across resistor R3 falls to about 0.5 volts, the voltage between the gate and cathode of the silicon-controlled rectifier 17 approaches about positive 0.5 volts. When this level is high enough, attributable to current flowing in resistor R2 and to reduced current flow through resistor R3 and through diode 35, then the silicon-controlled rectifier 17 will trigger to conduction, dumping the charge on capacitor C1 into transformer primary winding 41. Resistor R3 thus controls the triggering to conduction of the silicon-controlled rectifier 17 when the voltage on capacitor C1 has risen to a selected high percentage of the DC voltage across nodes N1 and N2. The dumping of charge happens quickly through the low impedance path of conductive SCR 17 and winding 41, thus allowing the use of a small, high-frequency transformer 9. The waveform on secondary winding 42 of transformer 9, for the dot polarity of windings 41 and 43 as shown in FIG. 1a, includes a substantial positive peak of voltage at node N6 which is conducted by diode CR5 51 to capacitor C2 53. The SCR 17 continues to conduct until the charge stored in capacitor 19 is substantially discharged. The resulting collapse of flux in the windings 41 and 42 of transformer 9 causes a voltage across primary winding 41 that establishes current flow in the forward direction through diode CR4 38 which again initiates the charging of capacitor 19. Similarly, collapsing the flux in transformer 9 causes a voltage across secondary winding 43 that establishes current flow in the forward direction through diode CR6 52 which charges capacitor C3 54. The resulting output voltages are more positive on node N8 and more negative on node N9 relative to the common connection of capacitors 53 and 54 to one terminal of the secondary winding 43 of transformer 9.

Immediately after the conduction cycle of the silicon-controlled rectifier 17, the capacitor 19 begins to recharge and the resulting current develops a negative voltage between the gate and cathode of the silicon-controlled rectifier 17 that keeps it turned off until the capacitor 19 is again charged. Thus, a continuous series of charging and discharging cycles occurs, producing a continuous high frequency waveform in transformer 9 without dependence upon any fly-back voltage from 43 to turn off, or maintain turned off, the silicon-controlled rectifier 17 during any portion of such charging or discharging cycles. The voltage developed across the secondary winding 42 of transformer 9 is directly proportional to the transformer turns ratio and the peak voltage attained by capacitor 19. Diodes CR5 and CR6 of full wave rectifier circuit 11 rectify this voltage, and capacitors C2 and C3 filter the voltage to produce high level positive and negative DC output voltages. According to an embodiment of the present invention, an input voltage of 120 volts RMS at nodes N2 and N3 produces an output voltage level of positive 8000 volts and negative 8000 volts at nodes N8 and N9. The repetition rate of the charge and discharge cycles is a function of the time constant determined substantially by resistor R1 and capacitor 19, and the peak voltage level attained by capacitor 19. The magnitude of the discharge current in capacitor 19 is a function of the capacitance of capacitor 19 (and of the capacitor peak voltage). Accordingly, a wide range of power outputs can be obtained by proper choice of circuit component values. The voltage and current levels that determine the point at which silicon-controlled rectifier 17 fires to conduction are small in magnitude, thus allowing operation over a large range of input voltage levels and an associated large range of the output voltages at nodes N8 and N9. These nodes may be directly connected to ion emitter electrodes for simultaneously producing supplies of positive and negative ions in the regions about such ion emitter electrodes (not shown).

Figure 1B:
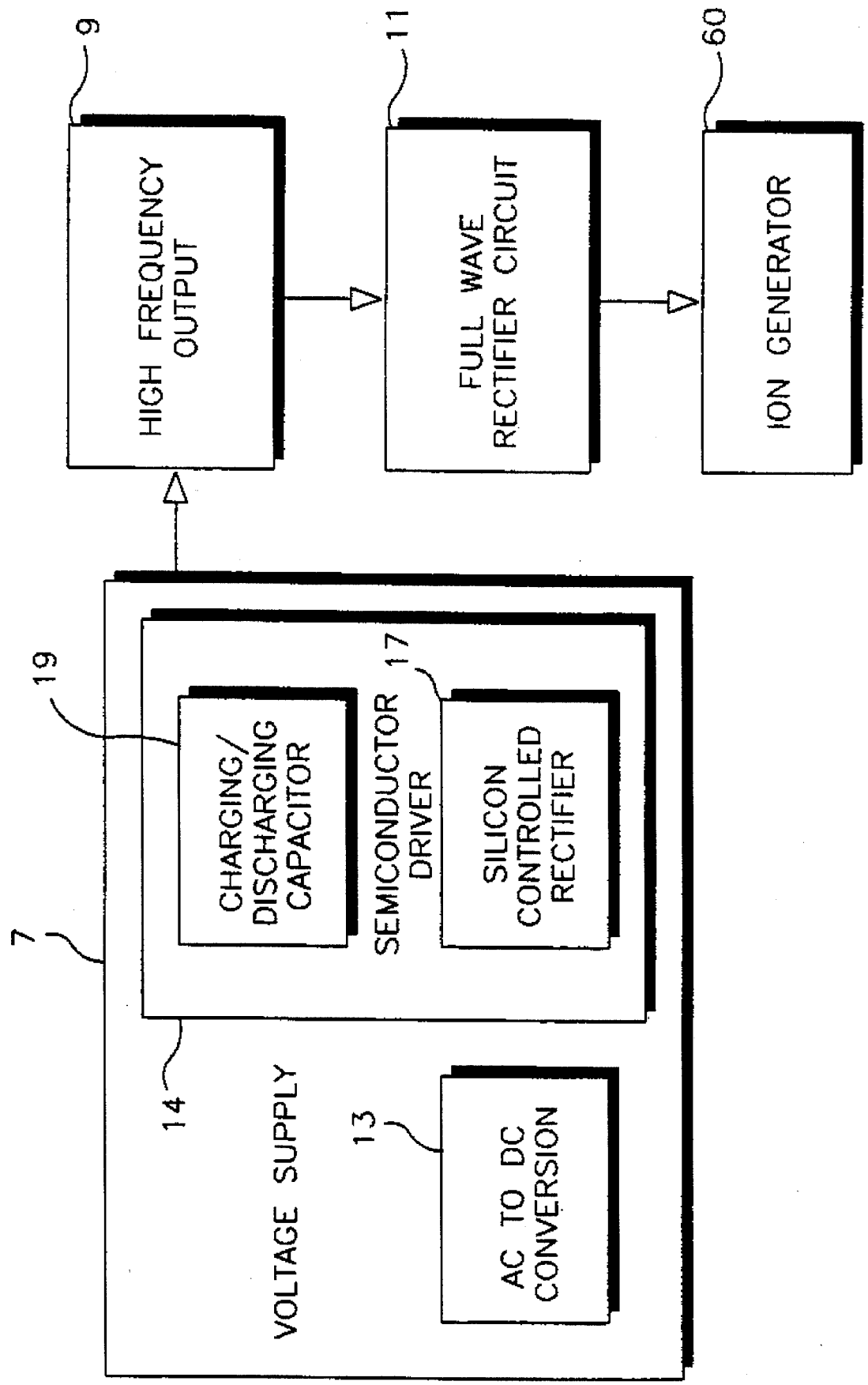

FIG. 1b shows a block diagram of the segments of the circuit of FIG. 1a. Additionally, the block diagram of FIG. 1b shows the output of full wave rectifier circuit 11 connected to an ion generator 60 such as a pair of ion emitter electrodes of conventional design (not shown). In operation, the circuitry shown in FIGS. 1a and 1b receives power from an AC line (not shown) applied between nodes N2 and N3 of FIG. 1a. Diode CR7 and capacitor C4 form an AC to DC conversion circuit 13 for charging capacitor C4 23 substantially to the peak value of the AC voltage received. The capacitor 23 is thus connected between the silicon-controlled rectifier circuitry 14 and the supply lines to filter out any noise signals conducted back to the supply lines.

Figure 1C:
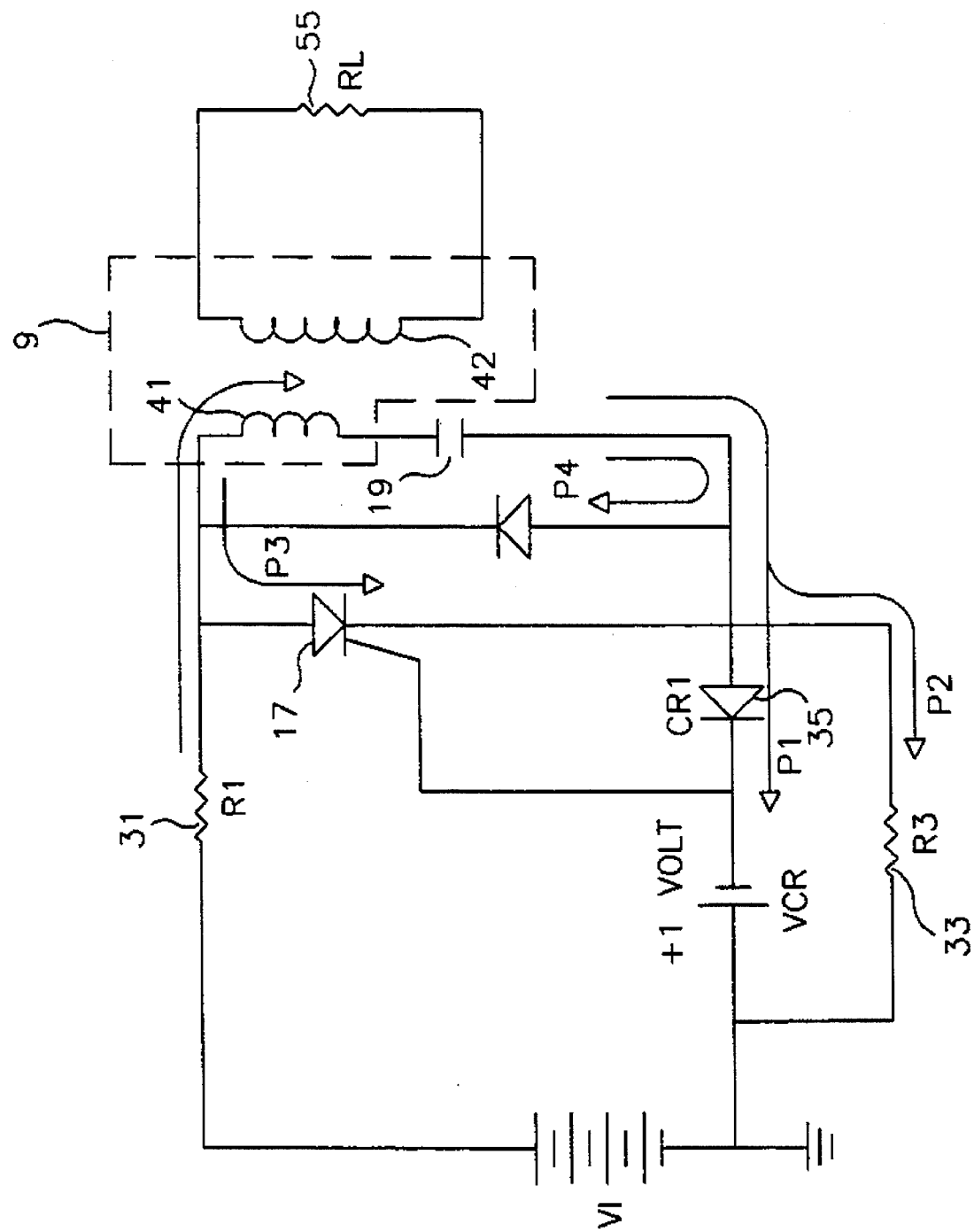

FIG. 1c shows a simplified circuit diagram of the high-voltage supply circuit of FIG. 1a, in which diodes CR2 and CR3 are shown replaced by a voltage source VCR of one volt magnitude. Further, transformer 9 is shown driving a simplified load comprising a single load resistor 55 referred to as resistor R1. In the circuit of FIG. 1c, capacitor C1 is just starting to charge up following a previous discharge. Initially, the current flow in CR1 along path P1 is higher than through R3 because the forward biased diode CR1 has a much lower resistance than R3. The voltage on the base is 1 volt, and the voltage on the silicon-controlled rectifier cathode is 1.5 volts. Accordingly, the silicon-controlled rectifier 17 is held in an OFF state. As the charging current falls exponentially, it reaches a point at which the current stops flowing through diode CR1 and only flows through resistor R3 along path P2. This is because of the reverse voltage drop of the 1 volt battery and the requirement of at least about 0.5 volt availability for diode CR1 to make it conduct. In other words the voltage at the anode of diode CR1 is less than 1.5 volts. As the charging current continues to drop, the voltage at the anode of diode CR1 keeps dropping. When it reaches about 0.3 volts silicon-controlled rectifier 17 will fire, since the gate to cathode voltage is now about 0.8 volts and current of sufficient magnitude, such as about 50 μA can flow into the gate and back to ground through resistor R3. Silicon-controlled rectifier 17 now discharges the charge in capacitor C1 through the transformer 9 primary winding 41. This current then oscillates back and forth in direction for a brief period before dying out. In the forward direction along path P3 it flows through silicon-controlled rectifier 17 since there is an oscillator voltage on the gate that allows the silicon-controlled rectifier to turn on during these parts of the cycle. In the back direction along path P4, it can be helped to flow efficiently if a back diode is placed across the silicon-controlled rectifier as shown. If the primary or secondary winding 41, 42 have a lot of parasitic shunt capacity, then this capacitance allows a back and forth oscillation without the need for the back diode. Immediately after firing, capacitor C1 begins charging again, providing the current necessary for holding the silicon-controlled rectifier gate negative as described previously.

Figure 2:
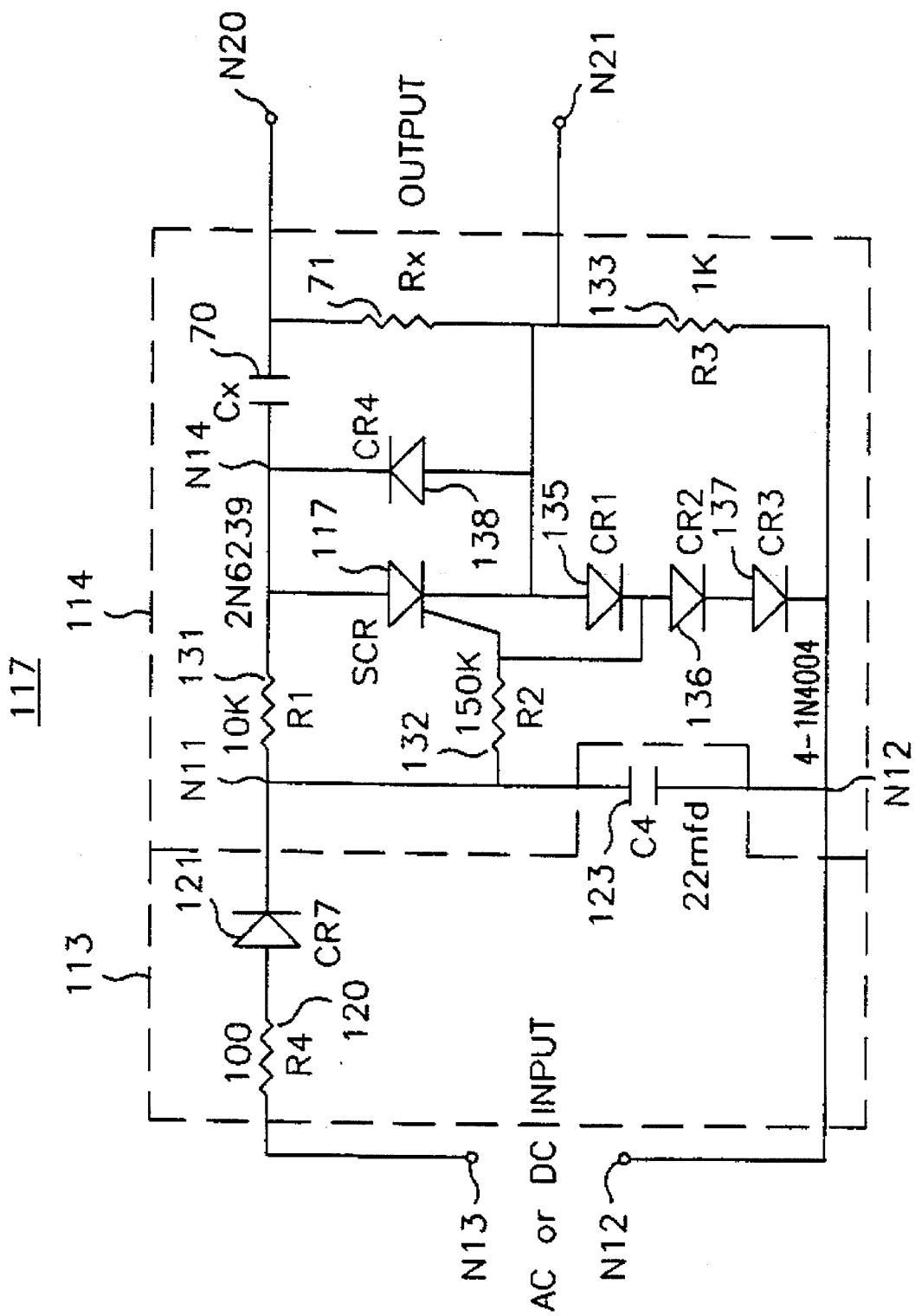
FIG. 2 shows a supply circuit diagram of the high-voltage supply circuit according to the present invention operable as an asynchronous pulse generator operable on either AC or DC supply voltages.

FIG. 2 shows a circuit diagram of a circuit 117 which is operable as an asynchronous pulse generator driven by either AC or DC voltage. FIG. 2 illustrates an embodiment of the present invention which is similar to the circuitry of FIG. 1a in that it includes an AC to DC conversion circuit 113 and a driver circuit 114 including a silicon-controlled rectifier 117 and capacitor 70. AC to DC conversion circuit 113 in FIG. 2 includes resistor 120 (also referred to as resistor R4) and diode 121 (also referred to as diode CR7) and filter capacitor C4 123 serially connected between input nodes N12 and N13.

The circuit 117 in FIG. 2 includes the driver circuit 114 which includes silicon-controlled rectifier 117 and resistors 131–133, and capacitor 70, and diodes 135–138 connected in an arrangement similar to the circuit previously described with reference to FIG. 1a. In one embodiment of the present invention, the four diodes 135–138 are 1N4004 devices, and silicon-controlled rectifier 117 is a 2N6239 device. Resistor 131 and capacitor 70 and resistor 71 and resistor 133 are serially connected between nodes N11 and N12. Thus, voltage appearing across nodes N11 and N12 (or at nodes N13 and N12) will cause a current to flow through resistors 131, 71, and 133 to charge up capacitor 70.

Silicon-controlled rectifier 117 and diodes CR1–CR3 are connected in series between nodes N14 and N12 and resistor 132 is connected in series with diodes CR2 and CR3 between nodes N11 and N12. Additionally, the gate of silicon-controlled rectifier 117 is connected to the common connection of diodes 135 and 136.

It is noted that diode CR1 is not needed to make the circuitry in FIGS. 1a, 1c, and 2 work. It is there to protect the silicon-controlled rectifier's gate from too much reverse voltage, which could cause the gate to eventually fail. Without it, the capacitor charging current would only flow through resistor R3, which creates too large a voltage drop. Silicon-controlled rectifiers have a maximum specified reverse gate voltage of 5 or 6 volts. Diode CR1 keeps the reverse voltage to no more than about 0.6 volts. Diode CR1 allows capacitor C1 to charge more rapidly due to its low impedance and voltage drop. This allows for a faster repetition rate of the charge-discharge cycle. In the present circuit this rate is about 450 Hertz. With each discharge, the paths P3 and P4 oscillate for about ten cycles at a rate of about 350 KHertz.

In operation, the circuit in FIG. 2 operates similar to the circuit of FIG. 1a, previously described. It should be noted that neither circuit depends upon fly back or collapse of flux in an output transformer to turn off the silicon-controlled rectifier 117 after discharge of capacitor 70. Accordingly, resistor 71 replaces a high frequency output transformer in a circuit which generates a continuous pulse waveform, with pulse width determined as a function of the values of capacitor CX 70 and resistors RX 71, and R1 131, and R3 133. Also, since filter capacitor 23 or 123 is connected in the circuit to filter fluctuations attributable to variations in current during circuit operations, such fluctuations do not affect line signal, thereby obviating line filters.

What is claimed is:

1. A converter circuit comprising:

a plural number of diodes serially connected for conducting current therethrough;

a silicon-controlled rectifier including a gate electrode and being serially connected with the diodes for conducting current therethrough, and the gate electrode being connected to the common connection of serially-connected one and another of the plural number of diodes;

a first resistor connecting the silicon-controlled rectifier to a first input node in a circuit that serially connects the plural number of diodes and a second input node;

a second resistor connected in parallel with the serially connected diodes;

a transformer having a primary winding and having a secondary output winding:

a capacitor serially connected with the primary winding of the transformer across the silicon-controlled rectifier for selective conduction of current from the capacitor through the primary winding and silicon-controlled rectifier;

and a third resistor connected between said first input node and said common connection of said serially connected diodes for forward biasing and conducting current through the number of diodes connected between the common connection and the second input node, said plural number of diodes initially conducting a portion of current charging the capacitor to produce a forward conduction voltage drop across said one of the diodes that is applied to the gate electrode to bias off the silicon-controlled rectifier during a portion of an interval for charging the capacitor toward a voltage on the first and second input nodes.

2. The circuit according to claim 1, wherein the resistance of said first resistor is approximately an order of magnitude greater than the resistance of the second resistor.

3. The circuit according to claim 1, wherein the resistance of said third resistor is at least an order of magnitude greater than the resistance of said first resistor.

4. The circuit according to claim 1 wherein said first and second input nodes are connected to a source of DC voltage.

* * * * *